United States Patent [19]

Nishida et al.

[11] 4,160,756
[45] Jul. 10, 1979

[54] USE OF METAL COMPOUND IN AN AUTODEPOSITION COATING COMPOSITION

[75] Inventors: Takao Nishida; Kiyoshi Tonoike, both of Osaka, Japan

[73] Assignee: Amchem Products, Inc., New York, N.Y.

[21] Appl. No.: 903,047

[22] Filed: May 5, 1978

Related U.S. Application Data

[60] Division of Ser. No. 720,033, Sep. 2, 1976, Pat. No. 4,103,049, which is a continuation of Ser. No. 446,032, Feb. 26, 1974, abandoned.

[30] Foreign Application Priority Data

Mar. 2, 1973 [JP]  Japan .................................. 48-25469

[51] Int. Cl.$^2$ ........................... B05D 1/18; C23F 7/00
[52] U.S. Cl. ..................... 260/29.6 M; 260/29.6 MM; 260/297 M; 148/6.14 R; 148/6.2; 427/435
[58] Field of Search ........................... 148/6.14 R, 6.2; 427/388 C, 341, 435, 437, 309; 260/29.6 M, 29.6 MM, 29.7 M

[56] References Cited

U.S. PATENT DOCUMENTS

| | | | |
|---|---|---|---|
| 3,413,158 | 11/1968 | Inouye et al. | 427/435 |
| 3,528,860 | 9/1970 | Kronstein | 427/435 X |
| 3,839,097 | 10/1974 | Hall et al. | 427/435 X |
| 3,865,617 | 2/1975 | Shimizu et al. | 427/435 |

OTHER PUBLICATIONS

Wiederholt, *Chemical Surface Treatment of Metals*, pp. 98 & 100, (1965).

*Primary Examiner*—Michael F. Esposito
*Assistant Examiner*—Richard Bueker
*Attorney, Agent, or Firm*—Dale Lynn Carlson

[57] ABSTRACT

Method and composition for applying a coating to a metal surface, the surface being contacted with an acidic aqueous coating composition comprising an organic coating-forming material, an acid, and a metal from a compound containing said metal, wherein the thickness and weight of the coating formed on the surface can be controlled by varying the amount of metal present in the composition and by varying the time the surface is contacted with the composition.

17 Claims, No Drawings

USE OF METAL COMPOUND IN AN AUTODEPOSITION COATING COMPOSITION

This is a division of application Ser. No. 720,033, filed Sept. 2, 1976 now U.S. Pat. No. 4,103,049 which is in turn a continuation of application Ser. No. 446,032 filed Feb. 26, 1974 and now abandoned.

A conventional composition comprising a resin dispersed in water which is utilized to form an organic coating on metal surfaces by immersing the surfaces in the composition, will result in a coating whose thickness is the same regardless of the time the composition is contacted with the surface. In order to obtain a thicker coating, it has been necessary to subject the metal surface to a multiple stage coating operation or to employ a bath having higher solids content therein. In addition, these conventional systems ordinarily do not form organic coatings on the metal surface which will initially resist rinsing, without a drying or fusing operation performed thereon.

U.S. Pat. No. 3,585,084 discloses compositions for coating metal surfaces comprising an organic coating-forming material, an oxygen containing oxidizing agent, hydrogen ion and an anion. Compositions comprising a resin dispersion, hydrogen ion, fluoride ion, and an oxidizing agent selected from the group consisting of hydrogen peroxide and dichromate, for coating metal surfaces are disclosed in U.S. Pat. No. 3,592,699. The coating weight of coatings produced employing compositions of this kind is a function of the time the surface is contacted with the composition. These coatings are capable of being rinsed prior to baking without removing all of the polymer or resin deposited on the surface.

Attempts have been made to adjust the rate at which these compositions form a coating on metal surfaces, by varying the concentration of hydrogen ion or oxidizing agent therein. It has been found that varying the concentrations and ratio of the constituents in these coating compositions in order to control the film-forming rate can affect the uniformity and appearance of the coating as well as the stability of the working coating bath.

A serious problem that has been encountered in the use of coating compositions described in the aforementioned references is that as the composition is used to coat quantities of metal surfaces, the composition becomes unstable. This instability is characterized by flocculation, coagulation or jelling of the organic coating-forming materials in the composition. After these compositions become unstable, they can no longer be used effectively to coat metal surfaces and are thereby rendered inoperative.

Apparently, these compositions are rendered unstable by the build-up of large amounts of metal ions which are dissolved from the metallic surface and are then oxidized by the oxidizing agent in the composition. As metal surfaces are continuously processed in these compositions, the amounts of these metal ions tend to build up to an undesirable level, thereby resulting in coagulation, flocculation or jelling of the dispersed resin therein. Attempts have been made to prevent the composition from becoming unstable by either removing the excess metal ions from the composition or by adding additional dispersing agent to the composition.

When these known compositions are contacted with, for instance ferrous metal surfaces, apparently iron is dissolved from the surface by the hydrogen ions present in the composition to form ferrous ions. The oxidizing agent in the composition acts on these ferrous ions to form ferric ions. Due to the action of the oxidizing agent which oxidizes the already dissolved metal ions to a higher valence state, thereby causing the metal surfaces to be constantly attacked by the hydrogen ion present, undesirably high concentrations of ferric ions are accumulated. In a commercial operation, where large quantities of metal are processed, these known coating compositions will require constant replenishment of dispersing agent or removal of metallic ions since the acid and oxidizing agent therein causes such high amounts of the ferric ion to enter the bath, due to the vigorous attack of the metal surface by these constituents.

A constant stability problem arises in these compositions, since there is constant generation of ferric ion, due to the conversion of ferrous ions, and apparent interaction between the ferric ion and the dispersing agent which maintains the resin particles in the dispersed state, thereby causing coagulation and jelling.

It is an object of the present invention to provide an improved process for forming an organic resinous coating on a metal surface. It is also an object of this invention to provide a method and composition for applying resinous coatings to metal surfaces, the coating rate at which said coatings are deposited, controlled by the amount of appropriate metal present in the coating composition.

It is an object of this invention to provide a process for continuously depositing an organic coating on quantities of metal surfaces without the rapid generation of large amounts of metallic ions which affect the stability of the composition.

A concomitant object of the present invention is to provide organic coatings on metal surfaces, whose coating weight is a function of contact time with the coating composition.

It has been discovered that a uniform smooth organic coating can be formed on a metal surface in a short time by the use of an aqueous coating composition consisting of a metal compound, acid, and particles of resin dispersed therein. The coating thickness, or the rate at which a coating is formed, can be readily controlled by adjusting the amount of metal added to the aqueous coating composition in the form of a metal compound.

It should be understood that "aqueous coating composition" means the aqueous acidic composition having dispersed resin, metal from a metal containing compound, acid, and suitable additive ingredients as described herein, which is employed in the process of this invention.

It should be understood that "metal surfaces" means various metal surfaces, such as aluminum, zinc, iron, nickel, tin and lead surfaces and any other surface of metals which are selected from a group of metals ranging from aluminum to copper in the order of the "ionization tendency," and which are present in the forms of pure metal and its alloys and also in the forms of plated metal surfaces. The term "iron surfaces" or "ferrous metal surfaces" employed herein thus encompasses a wide variety of steels, iron, and iron alloys, including alloys of iron with chromium and/or nickel. The term "aluminum surfaces" employed herein encompasses a wide variety of aluminum and aluminum alloys, including heat resistant alloys, corrosion resistant alloys and high strength aluminum alloys.

The term "zinc surfaces" employed herein encompasses a wide variety of zinc, zinc alloys and zinc plated metals, including hot dip galvanized steel and electrogalvanized steel. The term "copper surfaces" employed herein encompasses a wide variety of copper and copper alloys, including brass, bronze and German silver. The term "lead surfaces" employed herein encompasses a wide variety of lead and lead alloys, including soldering metals. The term "tin surfaces" employed herein encompasses a wide variety of tin, tin alloys, and tin plated metals, including tin plate. The term "nickel surfaces" employed herein encompasses a wide variety of nickel, nickel alloys and nickel plated metals, including nickel plated steel.

Of course, it is understood that the process of the present invention is carried out in a substantially electrostatic field-free environment, and the use of electricity and equipment and control instruments required to operate an electrocoat process is avoided.

The particles of resin dispersed in the composition, will ordinarily be in the form of latex of the resin. Latices, dispersions of insoluble resin particles in water, are readily available and those sold commercially can be utilized herein. These commercially available latices will usually contain other ingredients such as emulsifiers and protective colloids. Examples of commercially available latices which can be employed and which can be regarded as the preferred materials for use in the aqueous coating compositions of this invention are:

Hycar LX 407 (manufactured by Japanese Geon Co., Ltd.) . . . styrene butadiene copolymer Goodrite 1800×72 (manufactured by Goodrich Chemical Corp.) . . . styrene butadiene copolymer Durex 637 (manufactured by W. R. Grace) . . . styrene butadiene copolymer Pliolite 491 (manufctured by Goodyear Rubber and Chemical Corp.) . . . styrene butadiene copolymer Hycar LX 814 (manufactured by Japanese Geon Co., Ltd.) . . . acrylic copolymer Boncoat 9404 (manufactured by Dainippon Ink & Chemicals, Inc.) . . . acrylic copolymer Nipole 1571 (manufactured by Japanese Geon Co., Ltd.) . . . acrylnitrile butadiene copolymer Synthemal 9404 (manufactured by Nihon Reichold Co. Ltd.) . . . acrylic copolymer Polysol AP 300 (manufactured by Kobunshi Kagaku Kogyo Co., Ltd.) . . . acrylic copolymer Polysol EVA P 1 (manufactured by Kobunshi Kagaku Kogyo Co., Ltd.) . . . ethylene-vinyl acetate copolymer Poly-em 40 (manufactured by Gulf Oil Corp.) . . . polyethylene Other coating-forming resin dispersions or emulsions can be employed herein so long as the latex is stable in the presence of the other ingredients in the compositions of the present invention.

The amount of dispersed resin employed in the coating composition will depend on the amount of resin which can be dispersed therein and the amount needed to provide sufficient resinous material to form a coating. The concentration of dispersed resin can vary over a wide range and should preferably be from about 5 to about 550 g/l of resin. It is understood that the volume of latex necessary to provide the particular amount of resin in the coating composition will depend on the specific amount of resin solids dispersed in the latex to be employed.

For the coating process of the present invention to be effected, the concentration of metal in the coating composition should be maintained by employing a water soluble metal compound or a metal compound soluble in acidic aqueous compositions. The metal compound can be present in the composition in an amount from about 0.025 grams/liter to about 50 grams/liter. The concentration of metal in the composition will depend on the particular metal and metal compound employed. For example, ferric fluoride can be added to the coating composition in an amount from about 1.0 gram/liter to about 50 grams/liter and silver fluoride can be added to the bath in an amount from about 0.1 grams/liter to about 10 grams/liter. A wide variety of metal compounds can be employed in the practice of the present invention. Selection of the compound to be employed will depend on its commercial availability and its ability to liberate metal in the aqueous coating composition.

For example, metal compounds which will yield sufficient metal in the aqueous acidic coating composition for aluminum surfaces and zinc surfaces are ferric fluoride, ferrous oxide, ferric oxide, cupric sulfate and cobaltous nitrate. Metal compounds which will yield sufficient metal in the aqueous acidic coating compositions for ferrous, tin, and lead surfaces are ferric fluoride, ferrous oxide, ferric phosphate and silver fluoride. Metal compounds which will yield sufficient metal in the aqueous acidic coating composition for copper surfaces are silver fluoride and silver acetate.

It is noted that subject matter disclosed herein and relating to the use of metal compounds which comprise ferric iron is disclosed and claimed in co-pending U.S. patent application Ser. No. 445,434, filed Feb. 25, 1974, now abandoned, in the names of Nishida, an applicant herein, and Hirohata, said application being a continuation of U.S. patent application Ser. No. 232,625, filed Mar. 7, 1972, now abandoned. The subject matter of Ser. No. 445,434 is incorporated in two copending continuation-in-part applications, Ser. No. 797,758 and 797,759, now U.S. Pat. No. 4,106,036, both filed May 17, 1977. The omission of claims herein covering subject matter relating to the use of metal compounds comprising ferric iron is not to be construed as an abandonment of such subject matter inasmuch as such subject matter is disclosed and claimed in the aforementioned co-pending applications.

The acid to be employed in the composition of the present invention can be an inorganic or an organic acid. Typical examples of inorganic acids that can be employed are sulfuric, hyrochloric, hydrofluoric, nitric, and phosphoric acid. Examples of organic acids that can be employed are acetic, chloracetic, and trichloracetic acid. The acid to be employed in the process of the present invention must be present in sufficient quantity to maintain the pH of the solution at its desired level. The pH of the coating composition should be maintained at a level within the range of from about 1.6 to about 5.0.

The acid employed in the composition will dissociate to yield hydrogen ion and an anion. It has been observed that particularly good results are obtained when the acid employed in the coating composition is hydrofluoric acid. The preferred method of making the composition acidic comprises the use of hydrofluoric acid, which permits a simple means for control of pH in the coating composition and introduces an anion, that is fluoride ion, which allows for satisfactory operation of the process. The use of hydrofluoric acid prevents the deliberate inclusion of anions which may be undesirable and detrimental to the coating process. It should be understood that hydrofluoric acid is a preferred acid to be employed in the aqueous coating composition, but that other acids such as those described above can be employed with satisfactory results.

A preferred embodiment of this invention is to employ an operating aqueous coating composition comprising a combination of constituents consisting essentially of an anionic stabilized resin dispersion (negatively charged dispersed resin particles) having about 5 to about 550 grams/liter of resin solids, from about 1 to about 5 grams/liter of ferric fluoride trihydrate, and an acid in an amount sufficient to impart a pH to the aqueous composition of from about 1.6 to about 5.0.

A distinct advantage of the present process is that large quantities of metal surfaces can be contacted with the aqueous coating composition, for example, with little build-up of ferric ion caused by the acid attack on the ferrous metal surface. The present invention allows for controlled amounts of ferric ion in the coating composition. It has been found that the metal loss from a surface contacted with the aqueous coating composition will not exceed 40 mg per square foot per minute. The process of the present invention can be continuously effected for longer periods of time on greater quantities of metal.

In the coating operation, the metal substrate to be treated is brought into contact with the aqueous coating composition under suitable conditions of temperature and contact time. The time of treatment of the metal surface with the aqueous coating composition can be from about 15 seconds to about 10 minutes. It will be appreciated that with the use of the aqueous coating composition described herein, the coating weight of the deposited coating will increase with longer exposure of the metal surface to the action of the coating composition. Therefore, the coating time to be employed will depend on the coating weight desired. Preferably, contact time between metal substrate and coating composition should be from about 30 seconds to about 5 minutes. It should be noted that the coating weight for a particular coating composition will increase up to a maximum as the time of treatment is increased.

The coating process can be operated at temperatures from about 40° F. to about 120° F. It is preferable to operate the coating bath at ambient temperature, that is from about 60° F. to about 90° F. Generally, a slight change in the temperature of the aqueous coating composition will not necessitate substantial alteration of treating time and concentration parameters.

The process of the present invention can be effected by employing known contacting techniques. Contact can be effected by either immersion or flowcoating to produce the desired surface coating. Preferably, the aqueous coating composition will be contacted with the metal surface by conventional immersion methods.

Subsequent to contact with the aqueous coating composition, the surface should be dried to allow the resin to be fused. Prior to the drying operation, the coated surface can be exposed to an oxidative environment and then rinsed with water. It has been found that when the surface is exposed to an oxidative environment, such as allowing the surface to stand in air, for a time from about 15 seconds to about 10 minutes, followed by water rinsing, and then dried, the surface possesses a tight, adherent, and uniform coating. It should be understood that the time of exposure to air or other oxidative environment should not be long enough to allow the deposited coating to dry prior to rinsing. The exposure time to be employed will depend somewhat on the type of resin utilized to form the coating.

Subsequent to the water rinse, the coated surface can be rinsed with an aqueous rinse solution containing hexavalent chromium or hexavalent chromium and reduced forms of chromium. Subsequent to the rinse treatment, the coated surface should be dried or baked. This can be accomplished by conventional techniques, such as passing the metal surface through a heated environment such as an oven, subjecting it to a warm air stream, or by allowing it to dry at ambient temperature. Should speed be a necessary factor, any method of forced drying the surface can be accomplished. When a heated environment is used, drying may be carried out at temperatures above 150° F., and preferably from about 300° F. to about 500° F. It should be understood that whenever temperature is employed will depend to some extent on the type of latex or resin dispersion and the drying time that has been utilized.

The aqueous coating compositions of the present invention described hereinabove are capable of producing coatings on a metal surface which portray excellent adhesion to the surface and have excellent corrosion resistant properties. However, the aqueous coating compositions and the coatings deposited can be enhanced by incorporation into the coating composition of added constituents described hereinbelow.

An oxidizing agent may be incorporated into the aqueous coating composition. Any oxidizing agent can be employed and can be conveniently added to the composition as a water soluble compound. Typical examples of oxidizing agents that can be used are hydrogen peroxide, dichromate, permanganate, nitrate, persulfate, and perborate. In some instances, the addition of an oxidizing agent to the composition in an amount sufficient to provide from about 0.01 to about 0.2 of oxidizing equivalent per liter of composition may be desirable to obtain a coating having particular properties, such as heavier coating weights. It has been observed that addition of an oxygen containing oxidizing agent to the aqueous coating composition can result in higher coating weights than would ordinarily be obtained employing the same contact time. Should an oxygen containing oxidizing agent be employed in the composition, it will be appreciated that the working coating bath will require regorous control procedures, since the composition, when in contact with the metal workpieces, will generate large amounts or metal ions. It will be appreciated that addition of an oxidizing agent to the aqueous coating composition is not deemed desirable when large quantities of metals are to be processed. (The term "oxidizing equivalent" when used herein means the number of grams of oxidizing agent used, divided by the equivalent weight of the oxidizing agent. The equivalent weight of the oxidizing agent is the gram molecular weight of the agent divided by the changing valence of all stoms in the molecule which change valence, usually one element.)

A coalescing agent can be incorporated into the aqueous coating composition. The addition of a coalescing agent will further enhance the appearance and the corrosion resistant qualities of the deposited coating. A typical example of a coalescing agent which can be employed is ethylene glycol monobutyl ether. The coalescing agent can be present in the composition in an amount from about 5 grams/liter to about 30 grams/liter.

The coating composition of the present invention may be formulated so as to incorporate water dispersible pigments known to the art. Variations in the color of the deposited coating can be realized by adding pigments such as phthalocyanine blue, phthalocyanine green carbon black, quinacridone red, iron oxide red, iron oxide yellow, lead chromate, and chrome oxide green. These pigments provide excellent color variations with no sacrifice in coating quality or corrosion resistance.

To assure satisfactory wetting of the metallic surface during treatment with the coating composition, it may be desirable to incorporate into the composition a smalll amount of a wetting agent or surface active agent. Preferably, nonionic or anionic type wetting agents should be employed. Typical examples of wetting agents which can be utilized are alkyl phenoxy polyethoxy ethanol and sodium salts of alkylaryl polyether sulfonate.

Should a dry pigment be used in the coating composition, it can be dispersed in the aqueous coating composition by conventional procedures, such as mixing the pigment with a small amount of nonionic or anionic surface active agent and water, said mixture agitated with a high speed mixer, then adding the pigment - surface active agent mixture to the already prepared coating composition with further agitation.

A pigment, such as iron oxide red or iron oxide yellow, which is partially soluble in the aqueous coating composition, can be employed as a source for metal, particularly iron. Should the pigment be employed to serve as a source for iron, a sufficient amount of pigment must be added to provide sufficient iron in the composition to effect the process of the present invention.

To demonstrate the present invention, a series of examples are presented showing the use of particular aqueous coating compositions. It will be observed that some of the examples include the use of various other additives which have been found to be suitable for use in the compositions. The examples presented below are illustrative of this invention and are not considered as limiting for other materials and operative conditions falling within the scope of the invention that might be substituted.

In some of the examples below, corrosion tests and adhesion tests were run on the test panels. When salt spray corrosion tests were run on representative panels, the treated panels were scribed so that base metal was exposed. Panels were subjected to 5% salt spray and were rated inaccordance with ASTMB-1654-61, by measuring the average failure of the paint film from the scribe.

Adhesion tests were run on panels, using impact and cross-hatch test procedures which are commonly employed in the testing of paints. In the impact test, the test surface is impacted by a falling ½" ball with a force measured as 50 kilogram centimeters, thereby deforming the test surface. Subsequent to impact, the deformed surface is inspected for loose or cracked paint, usually on the reverse side of the impact, and rated in inches of paint failure. In the cross-hatch test, the surface is scribed with parallel lines, approximately 1 millimeter apart and out through to bare metal. Duplicate lines are scribed at right angles to make a cross-hatch pattern. Scotch brand cellophane tape is pressed smoothly over the scribed area. After several seconds, the tape is pulled back rapidly so that the tape is turned back upon itself approximately 180° from its original pressed position. Results are reported in the degree of failure noted, that is none, slight, moderate, or heavy loss of coating.

EXAMPLE 1–7

Panels of each metal described in Table 1, cleaned in a conventional alkali metal silicate cleaning solution, were immersed for 3 minutes in an aqueous coating composition comprising the following constituents:

| Component | Grams |
|---|---|
| Styrene-butadiene resin (HYCAR LX 407) | 180 |
| Hydrofluoric acid | 3 |
| Ferric fluoride (trihydrate) | 5 |
| Water to make 1 liter | |

Hycar LX 407 was employed as the source for the styrenebutadiene resin, (manufactured by Japanese Geon Co., Ltd., and containing 48% resin solids). The aqueous composition was prepared by mixing the resin with water, and adding hydrofluoric acid, and ferric fluoride with continuous agitation.

The test panels were removed from the coating bath and dried in an oven at 356° F. for 10 minutes. The average coating weight for the panels were as shown in Table 1, and the coatings produced were observed to be smooth and uniform.

Table 1

| EXAMPLE NO. | Metal Surface | Coating Weight | |
|---|---|---|---|
| | | mg/ft$^2$ | (g/m$^2$) |
| 1 | dull steel[*1] | 1673 | (18) |
| 2 | aluminum[*2] | 1951 | (21) |
| 3 | high strength Al alloy[*3] | 2138 | (23) |
| 4 | zinc[*4] | 1673 | (18) |
| 5 | hot dip galvanized steel[*5] | 1766 | (19) |
| 6 | tin plate[*6] | 1394 | (15) |
| 7 | lead[*7] | 1301 | (14) |

[*1] JIS G-3141, SPC-C
[*2] JIS H-4000, A1050p
[*3] JIS-4000, A-2024P
[*4] JIS H-4321, First Class
[*5] JIS G-3302, SPG-2C
[*6] JIS G-3303, SPT-E
[*7] JIS H-4301, PbP

EXAMPLE 8–58

These Examples were run to illustrate the use of various metal compounds as the source for metal ion in the aqueous coating composition.

The constituents in the respective compositions are reported below in Table 2, along with the measured average weight of the coatings produced.

The aqueous compositions employed in Examples 8–58 were prepared as set forth in Examples 1–7, except that different sources for metal were employed in each case.

Panels of each metal described in Table 2 were cleaned in a conventional alkali metal silicate cleaning solution, then immersed in the respective coating composition set forth in Table 2 for 3 minutes. The pH of each aqueous coating composition employed herein was between 1.6 and 5.0. The panels were dried in an oven at 356° F. for 10 minutes.

The average weight of the coating on the test panels was measured and is noted in Table 2.

Table 2

| Ex. No. | Latex Used and Resin therein | Resin (g/l) | Source for metal (g/l) | HF (g/l) | | Metal panel used as a substrate | Coating weight (g/m²) | mg/ft² |
|---|---|---|---|---|---|---|---|---|
| 8 | HYCAR LX 407, styrene | 180 | Ferric oxide | 3.5 | Water to make | Dull steel | (15) | 1394 |
| 9 | " | 180 | Ferric oxide 10 | 3.5 | " | Aluminum | (19) | 1766 |
| 10 | " | 180 | Ferric oxide 10 | 3.5 | " | High strength aluminum alloy | (21) | 1952 |
| 11 | " | 180 | Ferric oxide 10 | 3.5 | " | Zinc | (14) | 1301 |
| 12 | " | 180 | Ferric oxide 10 | 3.5 | " | Hot dip galvanized steel | (16) | 1487 |
| 13 | " | 180 | Ferric oxide 10 | 3.5 | " | Tin plate | (11) | 1022 |
| 14 | " | 180 | Ferrous oxide 10 | 3.5 | " | Dull steel | (10) | 929 |
| 15 | " | 180 | Ferrous oxide 10 | 3.5 | " | Aluminum | (16) | 1487 |
| 16 | " | 180 | Ferrous oxide 10 | 3.5 | " | High strength aluminum alloy | (17) | 1580 |
| 17 | " | 180 | Ferrous oxide 10 | 3.5 | " | Zinc | (12) | 1115 |
| 18 | " | 180 | Ferrous oxide 10 | 3.5 | " | Hot dip galvanized steel | (11) | 1022 |
| 19 | " | 180 | Ferrous oxide 10 | 3.5 | " | Tin plate | (7) | 651 |
| 20 | " | 180 | Ferric phosphate (tetrahydrate) 6 | 2.0 | " | Mill scaled steel | (14) | 1301 |
| 21 | " | 180 | Ferric phosphate (tetrahydrate) 6 | 2.0 | " | Aluminum | (19) | 1766 |
| 22 | " | 180 | Ferric phosphate (tetrahydrate) 6 | 2.0 | " | Zinc | (15) | 1394 |
| 23 | " | 180 | Ferric phosphate (tetrahydrate) 6 | 2.0 | " | Tin plate | (12) | 1115 |
| 24 | " | 180 | Ferric phosphate (tetrahydrate) 6 | 2.0 | " | Lead | (11) | 1022 |
| 25 | " | 180 | Ferrous phosphate (octahydrate) 6 | 2.0 | " | Mill scaled steel | (7) | 651 |
| 26 | " | 180 | Ferrous phosphate (octahydrate) 6 | 2.0 | " | Aluminum | (11) | 1022 |
| 27 | " | 180 | Ferrous phosphate (octahydrate) 6 | 2.0 | " | Zinc | (9) | 836 |
| 28 | " | 180 | Basic ferric acetate 5 | 3.0 | " | Dull steel | (16) | 1487 |
| 29 | " | 180 | Basic ferric acetate 5 | 3.0 | " | High strength aluminum alloy | (17) | 1580 |
| 30 | " | 180 | Basic ferric acetate 5 | 3.0 | " | Hot dip galvanized steel | (15) | 1394 |
| 31 | " | 180 | Basic ferric acetate 5 | 3.0 | " | Tin plate | (8) | 744 |
| 32 | " | 180 | Basic ferric acetate 5 | 3.0 | " | Lead | (7) | 651 |
| 33 | " | 180 | Chromium fluoride (trihydrate) 3 | 1.5 | " | Zinc | (10) | 929 |
| 34 | " | 180 | Cadmium fluoride 4 | 2.5 | " | High strength aluminum alloy | (8) | 744 |
| 35 | " | 180 | Cobaltous nitrate (hexahydrate) 10 | 3.5 | " | Mill scaled steel | (9) | 836 |
| 36 | " | 180 | Cobaltous nitrate (hexahydrate) 10 | 3.5 | " | Aluminum | (7) | 651 |
| 37 | " | 180 | Cobaltous nitrate (hexahydrate) 10 | 3.5 | " | Hot dip galvanized steel | (12) | 1115 |
| 38 | " | 180 | Stannous fluoride | 2.0 | " | High strength | (15) | 1394 |

Table 2-continued

| Ex. No. | Latex Used and Resin therein | Resin (g/l) | Source for metal (g/l) | HF (g/l) | Metal panel used as a substrate | Coating weight (g/m²) | mg/ft² |
|---|---|---|---|---|---|---|---|
| 39 | " | 180 | Stannous fluoride 6 | 2.0 | aluminum alloy Zinc | (17) | 1580 |
| 40 | " | 180 | Lead dioxide 8 | 3.5 | " Dull steel | (16) | 1487 |
| 41 | " | 180 | Cupric sulfate 10 | 3.0 | " Aluminum | (9) | 836 |
| 42 | " | 180 | Cupric sulfate 10 | 3.0 | " Hot dip galvanized steel | (15) | 1394 |
| 43 | " | 180 | Silver fluoride 5 | 2.0 | " Dull stell | (23) | 2138 |
| 44 | " | 180 | Silver fluoride 5 | 2.0 | " Mill scaled steel | (20) | 1859 |
| 45 | " | 180 | Silver fluoride 5 | 2.0 | " Aluminum | (20) | 1859 |
| 46 | " | 180 | Silver fluoride 5 | 2.0 | " High strength aluminum alloy | (26) | 2416 |
| 47 | " | 180 | Silver fluoride 5 | 2.0 | " Zinc | (16) | 1487 |
| 48 | " | 180 | Silver fluoride 5 | 2.0 | " Hot dip galvanized steel | (17) | 1580 |
| 49 | " | 180 | Silver fluoride 5 | 2.0 | " Nickel plated steel | (20) | 1859 |
| 50 | " | 180 | Silver fluoride 5 | 2.0 | " Lead | (11) | 1022 |
| 51 | " | 180 | Silver fluoride 5 | 2.0 | " Copper | (17) | 1580 |
| 52 | " | 180 | Silver fluoride 5 | 2.0 | " Brass | (15) | 1394 |
| 53 | " | 180 | Silver acetate 6 | 2.5 | " Dull steel | (19) | 1766 |
| 54 | " | 180 | Silver acetate 6 | 2.5 | " High strength aluminum alloy | (17) | 1580 |
| 55 | " | 180 | Silver nitrate 6 | 2.5 | " Zinc | (16) | 1487 |
| 56 | " | 180 | Silver nitrate 6 | 2.5 | " Nickel plated steel | (13) | 1208 |
| 57 | " | 180 | Silver nitrate 6 | 2.5 | " Copper | (13) | 1208 |
| 58 | " | 180 | Silver nitrate 6 | 2.5 | " Brass | (14) | 1301 |

EXAMPLE 59-72

These Examples were run to illustrate the use of various acids as the source for acid in the aqueous coating composition. The constituents in the respective coating compositions are reported below in Table 3, along with the measured average weight of the coatings produced.

The aqueous coating composition employed in Example 59-72 were prepared as set forth in Example 1-7, except that different sources for acid were employed in each case.

Panels of each metal described in Table 3 were cleaned in a conventional alkali metal silicate cleaning solution, then immersed in the respective coating composition set forth in Table 3 for 3 minutes. The pH of each aqueous coating composition employed herein was between 1.6 and 5.0.

The panels were then dried in an oven at 356° F. for 10 minutes. The average weight of the coating on the test panels was measured and is noted in Table 3.

Table 3

| Ex. No. | Latex Used and Resin therein | Resin (g/l) | Source for metal (g/l) | Acid (g/l) | | Metal panel used as a substrate | Coating weight (g/m²) | mg/ft² |
|---|---|---|---|---|---|---|---|---|
| 59 | HYCAR LX 407, styrene butadiene | 200 | Ferric fluoride 10 | Phosphoric acid 6 | Water to make 1 liter | Dull steel | (20) | 1859 |
| 60 | " | " | " | " | " | Aluminum | (28) | 2602 |
| 61 | " | " | " | " | " | high strength aluminum alloy | (29) | 2695 |
| 62 | " | " | " | " | " | Zinc | (18) | 1673 |
| 63 | " | " | " | " | " | Hot dip galvanized steel | (19) | 1766 |
| 64 | " | " | " | " | " | Tin plate | (13) | 1208 |
| 65 | " | " | " | " | " | Lead | (13) | 1208 |
| 66 | " | " | " | Sulfuric acid | " | Mill scaled steel | (8) | 744 |

Table 3-continued

| Ex. No. | Latex Used and Resin therein | Resin (g/l) | Source for metal (g/l) | Acid (g/l) | Metal panel used as a substrate | Coating weight (g/m²) | mg/ft² |
|---|---|---|---|---|---|---|---|
| 67 | " | " | " | 4 " | " Aluminum | (8) | 744 |
| 68 | " | " | Ferric fluoride (trihydrate) 10 | " | " Hot dip galvanized steel | (17) | 1580 |
| 69 | " | " | " 10 | Acetic acid 10 | " Dull steel | (14) | 1301 |
| 70 | " | 200 | Ferric fluoride (trihydrate) 10 | Acetic acid 10 | " High strength aluminum alloy | (17) | 1580 |
| 71 | " | " | " | " | " Zinc | (18) | 1673 |
| 72 | " | " | " | " | " Tin plate | (12) | 1115 |

EXAMPLE 73-83

These Examples were run to illustrate the use of various resins as the source for resin in the aqueous coating composition. The constituents in the respective coating compositions are reported below in Table 4, along with the measured average weight of the coatings produced.

The aqueous coating compositions employed in Example 73-83 were prepared as set forth in Example 1-7, except that different sources for resin were employed in each case.

Panels of each metal described in Table 4 were cleaned in a conventional alkali metal silicate solution, then immersed in the respective coating composition set forth in Table 4 for 3 minutes. The pH of each aqueous coating composition employed herein was between 1.6 and 5.0.

The panels were then dried in an oven at 356° F. for 10 minutes. The average weight of the coating on the test panels was measured and is noted in Table 4.

| Component | Grams |
|---|---|
| Styrene-butadiene resin (HYCAR LX 407) | 200.0 |
| Hydrofluoric acid | 2.5 |
| Hydrogenperoxide | 1.5 |
| Ferric fluoride (trihydrate) | 3.0 |
| water to make 1 liter | |

The test panels were contacted with the coating composition for a period of 3 minutes, then dried in an oven at 320° F. for 15 minutes. The average weight of the coatings is also listed in Table 5. It has been also observed in further experiments that the average weight of the coatings decreased by about 3-10 grams/m² when each metal panel described in Table 5 were immersed in the aqueous coating composition comprising the above-mentioned constituents but hydrogenperoxide.

Table 5

| Ex. No. | Metal panel used as a substrate | Coating weight (g/m²) | mg/ft² |
|---|---|---|---|

Table 4

| Ex. No. | Latex Used and Resin therein | Resin (g/l) | Source for metal (g/l) | HF (g/l) | | Metal panel used as a substrate | Coating weight (g/m²) | mg/ft² |
|---|---|---|---|---|---|---|---|---|
| 73 | Boncoat 9404, acrylic copolymer | 220 | Ferric fluoride (trihydrate) 6 | 2 | Water to make 1 liter | Dull steel | (13) | 1208 |
| 74 | " | 220 | " | " | " | Aluminum | (16) | 1487 |
| 75 | " | 220 | " | " | " | Zinc | (16) | 1487 |
| 76 | Nipole 1571 acrylonitrile-butadiene copolymer | 180 | " | " | " | Mill scaled steel | (14) | 1301 |
| 77 | " | 180 | " | " | " | High strength aluminum alloy | (34) | 3160 |
| 78 | " | 180 | " | " | " | Hot dip galvanized steel | (22) | 2045 |
| 79 | " | 180 | " | " | " | Tin plate | (7) | 651 |
| 80 | Primal ASE-60, polyacrylic acid | 300 | " | " | " | Dull steel | (13) | 1208 |
| 81 | " | 300 | " | " | " | Aluminum | (16) | 1487 |
| 82 | " | 300 | " | " | " | Hot dip glavanized steel | (19) | 1766 |
| 83 | " | 300 | " | " | " | Lead | (6) | 558 |

EXAMPLE 84-89

Panels of each metal described in Table 5 were immersed in the aqueous coating composition comprising the following constituents:

| 84 | Dull steel | (31) | 2881 |
|---|---|---|---|
| 85 | Aluminum | (18) | 1673 |
| 86 | Zinc | (26) | 2416 |
| 87 | Tin plate | (15) | 1394 |
| 88 | Lead | (12) | 1115 |
| 89 | Copper | (13) | 1208 |

EXAMPLE 90–94

Panels of each metal described in Table 6 were immersed in the aqueous coating composition comprising the following constituents. The test panels were contacted with the coating composition for a period of 2 minutes, then dried in an oven at 392° F. for 5 minutes. The average weight of the coatings produced is also listed in Table 6.

It should be noted that the aqueous coating composition employed herein contained chromic acid as an oxygen containing oxidizing agent, and butylcellosolve as a coalescing agent.

| Component | Grams |
|---|---|
| Styrene butadiene resin (HYCAR LX 407) | 160 |
| Hydrofluoric acid | 3 |
| Chromic acid anhydride | 1 |
| Ferric phosphate (tetrahydrate) | 8 |
| Butylcellosolve | 10 |
| Water to make 1 liter | |

Table 6

| EXAMPLE No. | Metal Surface | Coating weight (g/m$^2$) | mg/ft$^2$ |
|---|---|---|---|
| 90 | Dull steel | (21) | 1952 |
| 91 | High strength Al alloy | (27) | 2509 |
| 92 | Hot dip galvanized steel | (23) | 2138 |
| 93 | Tin plate | (12) | 1115 |
| 94 | Brass | (15) | 1394 |

EXAMPLE 95–101

Various metal panels noted in Table 7 were employed in this procedure. The test panels were cleaned in a conventional alkali metal silicate cleaning solution and then immersed in the aqueous coating composition described below. The panels were then baked in an oven at 392° F. for 5 minutes. The average coating weight of the coatings produced was measured and is listed in Table 7.

| Component | Grams |
|---|---|
| Styrene butadiene resin (HYCAR LX 407) | 180 |
| Lead chromate pigment | 95 |
| Anionic surface active agent (Demol-P) | 5 |
| Ferric fluoride (trihydrate) | 8 |
| Hydrofluoric acid | 3 |
| Water to make 1 liter | |

It will be observed that lead chromate pigment was employed in the composition. The lead chromate, an anionic surfactant (Demol-P) and water were mixed together and milled for 16 hours prior to addition to the already prepared composition containing the styrene butadiene resin, hydrofluoric acid and water.

The lead chromate pigment employed in the composition was Kiku-Jirushi G (manufactured by Kikuchi Kogyo).

Table 7

| Ex. No. | Metal panel used as a substrate | Coating weight (g/m$^2$) | mg/ft$^2$ |
|---|---|---|---|
| 95 | Dull steel | (120) | 1152 |
| 96 | Aluminum | (45) | 4182 |
| 97 | High strength aluminum alloy | (44) | 4089 |
| 98 | Zinc | (66) | 6134 |
| 99 | Hot dip galvanized steel | (89) | 8271 |
| 100 | Tin plate | (110) | 10223 |
| 101 | Lead | (32) | 2974 |

EXAMPLE 102–107

Panels of each metal described in Table 8 was immersed in the aqueous coating composition comprising the following constituents:

| Component | Grams |
|---|---|
| Styrene-butadiene resin (HYCAR LX 407) | 200 |
| Lead chromate pigment (KIKU-JIRUSHI 5G-3KB, manufactured by Kikuchi Kogyo) | 50 |
| Ferric oxide pigment (MAPICO YELLOW LL.XLO, manufactured by Titan Industry) | 30 |
| Anionic surface active agent (EMAL 10, manufactured by Kao-Atlas) | 3 |
| Hydrofluoric acid | 3.5 |
| Tap water to make 1 liter | |

The test panels were contacted with the coating composition for a period of 3 minutes, then dried in an oven at 356° F. for 10 minutes. The average coating weight for the panels were shown in Table 8, and the coatings produced were observed to be smooth and uniform.

Table 8

| Ex. No. | Metal Surface | Coating weight (g/m$^2$) | mg/ft$^2$ |
|---|---|---|---|
| 102 | Dull steel | 75 | 6970 |
| 103 | Aluminum | 57 | 5297 |
| 104 | Zinc | 72 | 6691 |
| 105 | Nickel plated steel | 10 | 929 |
| 106 | Tin plate | 76 | 7063 |
| 107 | Lead | 37 | 3439 |

EXAMPLE 108–130

Various metal panels were cleaned in a conventional alkali metal silicate cleaning solution and then immersed in the aqueous coating composition described in Table 9 for 3 minutes. The panels were then baked in an oven at 392° F. for 5 minutes. The average coating weight of the coatings produced was measured and is listed in Table 9.

Table 9

| Ex. No. | Latex used and resin therein | Resin (g/l) | Pigment (g/l) | Surface active agent (g/l) | Source for metal (g/l) | HF (g/l) | Metal Surface | Coating weight (g/m$^2$) | mg/ft$^2$ |
|---|---|---|---|---|---|---|---|---|---|
| 108 | HYCAR LX 407, styrene butadiene | 200 | Lead chromate, Kiku J.5G-3KB 80 | Demol-P 4 | Ferric phosphate tetrahydrate 5 | 2 | Water to make 1 liter / Dull steel | (98) | 9108 |
| 109 | " | " | " | " | " | " | High strength aluminum alloy | (48) | 4461 |

Table 9-continued

| Ex. No. | Latex used and resin therein | Resin (g/l) | Pigment (g/l) | Surface active agent (g/l) | Source for metal (g/l) | HF (g/l) | Metal Surface | Coating weight (g/m²) | mg/ft² |
|---|---|---|---|---|---|---|---|---|---|
| 110 | " | " | " | " | " | " | Hot dip galvanized steel | (69) | 6412 |
| 111 | " | " | " | " | " | " | Tin plate | (73) | 6784 |
| 112 | " | " | " | " | " | " | Lead | (34) | 3160 |
| 113 | " | 160 | Iron oxide red, Todacolor KR-R 60 | Demol-P 5 | Pigment used | 3.5 | Dull steel | (31) | 2881 |
| 114 | " | " | " | " | " | " | " | Aluminum | (22) | 2045 |
| 115 | " | " | " | " | " | " | " | Zinc | (30) | 2788 |
| 116 | " | " | " | " | " | " | " | Lead | (15) | 1394 |
| 117 | Nipole 1571, acrylonitrile-butadiene | 250 | Moraco Carbon H, Columbia C. 30 | Emulgen 930, Kao-Atlas, 1 | Ferric fluoride trihydrate 5 | 2.5 | Water to make 1 liter | Dull steel | (20) | 1859 |
| 118 | " | " | " | " | " | " | " | Aluminum | (26) | 2416 |
| 119 | " | " | " | " | " | " | " | Hot dip galvanized | (27) | 2509 |
| 120 | " | " | " | " | " | " | " | Tin plate | (13) | 1208 |
| 121 | HYCAR LX 407, styrene-butadiene | 180 | Cyanine Blue KR, Sanyo Shikiso 15 | Emal 10, Kao-Atlas. 0.5 | Silver fluoride 6 | 3 | Water to make 1 liter | Dull steel | (25) | 2342 |
| 122 | " | " | " | " | " | " | "Mill scaled steel | (19) | 1766 |
| 123 | " | " | " | " | " | " | Aluminum | (24) | 2230 |
| 124 | " | " | " | " | " | " | High strength aluminum alloy | (27) | 2509 |
| 125 | " | " | " | " | " | " | " | Zinc | (21) | 1952 |
| 126 | " | " | " | " | " | " | " | Hot dip, galvanized steel | (20) | 1859 |
| 127 | " | " | " | " | " | " | " | Nickel plated steel | (22) | 2045 |
| 128 | " | " | " | " | " | " | " | Lead | (12) | 1115 |
| 129 | " | " | " | " | " | " | " | Copper | (20) | 1859 |
| 130 | " | " | " | " | " | " | " | Bronze | (19) | 1766 |

EXAMPLE 131

Steel panels were employed in this procedure. The test panels were cleaned in a conventional alkali metal silicate cleaning solution and then immersed in the aqueous coating composition described below for different contact times. The test panels were then allowed to stand in air for 3 minutes and then rinsed with water. The panels were then baked in an oven at 356° F. for 10 minutes. The average coating weight of the coatings produced was measured and is listed in Table 10.

| Component | Grams |
|---|---|
| Styrene butadiene resin (HYCAR LX 407) | 180 |
| Lead chromate pigment | 50 |
| Iron oxide red pigment | 50 |
| Anionic surface active agent (Demol-P) | 5 |
| Hydrofluoric acid | 3.5 |
| Water to make 1 liter | |

It will be observed that lead chromate pigment and iron oxide red pigment were employed in the composition. The lead chromate, iron oxide red, an anionic surfactant (Demol-P) and water were mixed together and milled for 16 hours prior to addition to the already prepared composition containing the styrene butadiene resin, hydrofluoric acid and water. The pH of the aqueous coating composition was measured at 2.8.

The lead chromate pigment employed in the composition was Kiku-Jirushi 5G (manufactured by Kikuchi Kogyo) and iron oxide red pigment was Tenyo Bengara 501 (manufactured by Tone Sangyo).

Table 10

| Time of Immersion | Coating Weight mg/ft² |
|---|---|
| 15 sec. | 649 |
| 30 sec. | 803 |
| 1 min. | 1224 |
| 2 min. | 2257 |
| 3 min. | 3544 |
| 5 min. | 5608 |

As can be seen from Table 10, the coatings deposited on test panels treated in accordance with the present invention have the property of increased coating weight with increased contact time.

EXAMPLE 132

Steel panels were employed in this procedure. The test panels were cleaned in a conventional alkali metal silicate cleaning solution and the immersed in the aqueous coating composition described below for 3 minutes. The coated test panels were then exposed to the air for periods of time as noted below and then were rinsed with water. The panels were then baked in an oven at 356° F. for 10 minutes.

| Component | Grams |
| --- | --- |
| Styrene butadiene resin (HYCAR LX 407) | 180 |
| Lead chromate (Kiku Jirushi 5G) | 50 |
| Iron oxide (Tenyo Bengara 501) | 50 |
| Anionic surface active agent (Demol-P) | 5 |
| Hydrofluoric acid | 3 |
| Water to make 1 liter | |

It will be observed that lead chromate pigment and iron oxide red pigment were employed in the composition. The lead chromate, iron oxide, and anionic surfactant (Demol-P) and water were mixed together and milled for 16 hours prior to addition to the already prepared composition containing the styrene butadiene resin, hydrofluoric acid and water. The coatings produced were observed to be smooth and uniform. The average film thickness was measured and is listed in Table 11. The test panels were subjected to 168 hours salt spray corrosion tests and the results are listed in Table 11.

Table 11

| | Film thickness (microns) | Scribe failure (in inches) |
| --- | --- | --- |
| 5 sec. | 13 | 1/32 |
| 15 sec. | 17 | 1/32 |
| 30 sec. | 22 | 1/32 |
| 1 min. | 25 | 1/32 |
| 2 min. | 28 | 1/32 |
| 3 min. | 28 | 3/32 |

Impact tests, cross-hatch tests, and salt spray corrosion test were run on representative panels treated in accordance with some of the aforementioned procedures, that is, Example 1, 2, 4, 6 and 51. The results of these tests are listed in Table 12 and also in Table 13.

Table 12

| Coating Composition | Film Appearance + coating weight in (gr/m$^2$) | mg/ft$^2$ | Impact Test Results | Cross Hatch Test Results | Metal Surface |
| --- | --- | --- | --- | --- | --- |
| Ex. No. 1 | Good (18) | 1673 | No failure | None | Dull steel |
| Ex. No. 2 | Excellent (21) | 1952 | No failure | None | Aluminum |
| Ex. No. 4 | Good (18) | 1673 | No failure | None | Zinc |
| Ex. No. 6 | Excellent (15) | 1394 | No failure | None | Tin plate |
| Ex. No. 51 | Good (17) | 1580 | No failure | None | Copper |

Table 13

| Coating Composition | Film Appearances + Coating Weight in (gr/m$^2$) | mg/ft$^2$ | Salt Spray test results* | Metal surface |
| --- | --- | --- | --- | --- |
| Ex. No. 102 | Excellent (75) | 6970 | No failure | Dull steel |
| Ex. No. 103 | Good (57) | 5291 | No failure | Aluminum |
| Ex. No. 104 | Excellent (72) | 6691 | Slight white-rust | Zinc |
| Ex. No. 106 | Excellent (76) | 7063 | No failure | Tin plate |
| Ex. No. 129 | Good (20) | 1859 | No failure | Copper |

*Exposure time : 150 hours

As can be seen from Table 12 and 13, test panels treated in accordance with the present invention give acceptable adhesion and corrosion test results.

We claim:

1. An acidic aqueous coating composition comprising about 5 to about 550 g/l of solid resin particles, and of pH within the range of about 1.6 to about 5 and prepared from hydrofluoric acid, and about 0.025 to about 50 g/l of a metal-containing compound which is soluble in said composition, the metal of said compound selected from the group consisting of silver, iron in its divalent state, copper in its divalent state, cobalt in its divalent state, chromium in its trivalent state, cadmium, tin in its divalent state and lead in its tetravalent state, said composition being effective in forming on said metal surface a resinous coating which increases in weight or thickness the longer said surface is immersed in said composition.

2. A composition according to claim 1 wherein said metal-containing compound is selected from the group consisting of silver fluoride, silver acetate, silver nitrate, ferrous oxide, ferrous phosphate, cupric sulfate, cobaltous nitrate, chromium fluoride, cadmium fluoride, stannous fluoride, and lead dioxide.

3. A composition according to claim 1 wherein said coating composition includes an oxidizing agent.

4. A composition according to claim 3 wherein said oxidizing agent is hydrogen peroxide in an amount of about 0.01 to about 0.2 oxidizing equivalent per liter of composition.

5. A composition according to claim 1 wherein said composition includes a coalescing agent.

6. A composition according to claim 5 wherein said coalescing agent is ethylene glycol monobutylether in an amount of about 5 to about 30 g/l.

7. A composition according to claim 1 wherein said coating composition includes a pigment.

8. A composition according to claim 7 wherein said metal-containing compound and said pigment comprise iron oxide red or iron oxide yellow.

9. A composition according to claim 1 wherein said resin is anionically stabilized.

10. An acidic aqueous coating composition for applying a resinous coating to a metal surface comprising about 5 to about 550 g/l of solid resin particles, and of pH within the range of about 1.6 to about 5 and prepared from hydrofluoric acid, and including metal selected from the group consisting of chromium, cobalt, copper, silver, cadmium, tin, lead and ferrous iron, the source of said metal being about 0.025 to about 50 g/l of a metal-containing compound which is soluble in said composition and contains said metal, said composition being effective in forming on said metal surface a resinous coating which increases in weight or thickness the longer said surface is immersed in said composition.

11. A composition according to claim 10 wherein said resin is anionically stabilized.

12. A composition according to claim 10 wherein said metal is silver, the source of which is about 0.1 to about 10 g/l of silver fluoride.

13. An acidic aqueous coating composition for applying a resinous coating to a metal surface comprising about 5 to about 550 g/l of solid resin particles, and of pH within the range of about 1.6 to about 5 and prepared from hydrofluoric acid, and about 0.025 to about 50 g/l of a metal-containing compound which is soluble in said composition, the metal of said compound selected from the group consisting of non-ferric transition elements and Group IV elements of the Periodic Table, said composition being effective in forming on said metal surface a resinous coating which increases in weight or thickness the longer said surface is immersed in said composition.

14. An acidic aqueous coating composition for applying a resinous coating to a metal surface comprising about 5 to about 550 g/l of solid resin particles, and of pH within the range of about 1.6 to about 5 and prepared from about 0.025 to about 50 g/l of a metal-containing compound which is soluble in said composition, the metal of said compound selected from the group consisting of silver, iron in its divalent state, copper in its divalent state, cobalt in its divalent state, cadmium, tin in its divalent state and lead in its tetravalent state, said composition being effective in forming on said metal surface a resinous coating which increases in weight or thickness the longer said surface is immersed in said composition.

15. An acidic aqueous coating composition for applying a resinous coating to a metal surface comprising about 5 to about 550 g/l of solid resin particles, and of pH within the range of about 1.6 to about 5 and including metal selected from the group consisting of cobalt, copper, silver, cadmium, tin, lead, and ferrous iron, the source of said metal being a metal-containing compound which is soluble in said composition and contains said metal, said composition being effective in forming on said metal surface a resinous coating which increases in weight or thickness the longer said surface is contacted with said composition.

16. An acidic aqueous coating composition for applying a resinous coating to a metal surface comprising about 5 to about 550 g/l of solid resin particles anionically stabilized, and of pH within the range of about 1.6 to about 5 and prepared from a metal-containing compound which is soluble in said composition, the metal of said compound selected from the group consisting of non-ferric transition elements and Group IV elements of the Periodic Table, said composition being effective in forming on said metal surface a resinous coating which increases in weight or thickness the longer said surface is contacted with said composition.

17. An acidic aqueous coating composition for applying a resinous coating to a metal surface comprising about 5 to about 550 g/l of solid resin particles, the resin being selected from the group consisting of styrene-butadiene, acrylic copolymers, acrylonitrile-butadiene, ethylene-vinyl acetate, polyethylene, and polyacrylic acid, and of pH within the range of about 1.6 to about 5 and prepared from a metal-containing compound which is soluble in said composition, the metal of said compound selected from the group consisting of non-ferric transition elements and Group IV elements of the Periodic Table, said composition being effective in forming on said metal surface a resinous coating which increases in weight or thickness the longer said surface is contacted with said composition.

* * * * *

UNITED STATES PATENT AND TRADEMARK OFFICE
CERTIFICATE OF CORRECTION

PATENT NO. : 4,160,756
DATED : July 10, 1979
INVENTOR(S) : Takao Nishida and Kiyoshi Tonoike It is certified that error appears in the above-identified patent and that said Letters Patent are hereby corrected as shown below:

On the cover page of the patent, in the lines identified by "[73] Assignee:", for "New York, N.Y." read --Ambler, Pa.--.

Column 4, line 36, after "797,759," delete "now U.S. Pat. No. 4,106,036,".

Column 6, line 15, for "whenever" read --whatever--.

Column 8, line 42, for "A1050p" read --A-1050P--.

Column 9-10, in Table 2, Ex. 8, under heading "Latex Used and Resin therein", after "styrene" read --butadiene--.

Column 9-10, in Table 2, Ex. 8, under heading "Source for Metal (g/l)", following "Ferric oxide" read --10--.

Column 9-10, Table 2, Ex. 8, following "Water to make" read --1 liter--.

Column 11-12, Table 2, Ex. 43, under heading "Metal panel used as a substrate" for "stell" read --steel--.

Column 16, line 10, under heading "mg/ft$^2$", for "1152" read --11152--.

Column 17-18, Table 9, Ex. 122, for "mill scaled" read --"--.

Column 17-18, Table 9, Ex. 122, under heading "Metal Surface" for "(19)" read --mill scaled steel--.

UNITED STATES PATENT AND TRADEMARK OFFICE
CERTIFICATE OF CORRECTION

PATENT NO. : 4,160,756
DATED : July 10, 1979
INVENTOR(S) : Takao Nishida and Kiyoshi Tonoike It is certified that error appears in the above-identified patent and that said Letters Patent are hereby corrected as shown below:

Column 17-18, Table 9, Ex. 122, under heading "(g/m$^2$)" for "1766" read --(19)--.

Column 17-18, Table 9, Ex. 122, under heading "mg/ft$^2$" read --1766--.

Signed and Sealed this

Fifth Day of August 1980

[SEAL]

Attest:

Attesting Officer

SIDNEY A. DIAMOND

Commissioner of Patents and Trademarks